United States Patent
Kim et al.

(10) Patent No.: US 10,028,227 B2
(45) Date of Patent: Jul. 17, 2018

(54) MOBILE TERMINAL AND MOTION-BASED LOW POWER IMPLEMENTING METHOD THEREOF

(71) Applicant: LG ELECTRONICS INC., Seoul (KR)

(72) Inventors: Byoungeul Kim, Seoul (KR); Hyunjin Kim, Seoul (KR); Chohee Kwon, Seoul (KR); Jongbeom Kim, Seoul (KR); Hyunwoo Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/506,656

(22) PCT Filed: May 18, 2015

(86) PCT No.: PCT/KR2015/004941
§ 371 (c)(1),
(2) Date: Feb. 24, 2017

(87) PCT Pub. No.: WO2016/043405
PCT Pub. Date: Mar. 24, 2016

(65) Prior Publication Data
US 2017/0280394 A1    Sep. 28, 2017

(30) Foreign Application Priority Data
Sep. 19, 2014    (KR) .................. 10-2014-0125142

(51) Int. Cl.
*H04B 1/38* (2015.01)
*H04M 1/00* (2006.01)
(Continued)

(52) U.S. Cl.
CPC ........ *H04W 52/0254* (2013.01); *G04G 21/00* (2013.01); *G06F 1/1686* (2013.01);
(Continued)

(58) Field of Classification Search
CPC ......... H04W 52/0254; H04W 52/0209; H04M 1/73
See application file for complete search history.

(56) References Cited

U.S. PATENT DOCUMENTS

| | | | |
|---|---|---|---|
| 2011/0151934 A1* | 6/2011 | Geng | H04M 1/67 455/565 |
| 2012/0235790 A1* | 9/2012 | Zhao | G06F 21/32 340/5.83 |

(Continued)

FOREIGN PATENT DOCUMENTS

| | | |
|---|---|---|
| JP | 2007-128266 A | 5/2007 |
| JP | 2014-27386 A | 2/2014 |
| JP | 2014-155103 A | 8/2014 |

*Primary Examiner* — Nguyen Vo
(74) *Attorney, Agent, or Firm* — Birch, Stewart, Kolasch & Birch, LLP

(57) ABSTRACT

Disclosed are a mobile terminal capable of implementing an always-on function with a lower power, based on a motion, and a motion-based low power implementing method thereof. The method includes sensing a motion of a user by using an acceleration sensor in a low-power always-on that only the acceleration sensor is activated; a selectively activating an always-on function according to the sensed motion and deactivating the always-on function when no motion is sensed in an always-on state and automatically entering to the low-power always-on function.

24 Claims, 18 Drawing Sheets

(51) Int. Cl.

| | | |
|---|---|---|
| *H04W 52/02* | (2009.01) | |
| *H04M 1/73* | (2006.01) | |
| *G06F 1/16* | (2006.01) | |
| *G06F 1/32* | (2006.01) | |
| *G06K 9/00* | (2006.01) | |
| *G06T 7/20* | (2017.01) | |
| *G04G 21/00* | (2010.01) | |
| *G06F 3/03* | (2006.01) | |

(52) U.S. Cl.
CPC .......... *G06F 1/1694* (2013.01); *G06F 1/3231* (2013.01); *G06F 1/3265* (2013.01); *G06F 1/3287* (2013.01); *G06F 3/0304* (2013.01); *G06K 9/00241* (2013.01); *G06T 7/20* (2013.01); *H04M 1/73* (2013.01); *G06F 2200/1637* (2013.01); *H04M 2250/12* (2013.01); *H04M 2250/52* (2013.01); *Y02D 10/171* (2018.01); *Y02D 10/173* (2018.01); *Y02D 70/00* (2018.01); *Y02D 70/1222* (2018.01); *Y02D 70/1242* (2018.01); *Y02D 70/1244* (2018.01); *Y02D 70/1246* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/162* (2018.01); *Y02D 70/164* (2018.01); *Y02D 70/166* (2018.01); *Y02D 70/168* (2018.01); *Y02D 70/26* (2018.01)

(56) References Cited

U.S. PATENT DOCUMENTS

| | | | |
|---|---|---|---|
| 2013/0325392 A1 | 12/2013 | Takahashi | |
| 2014/0221051 A1 | 8/2014 | Oguri | |
| 2014/0267799 A1* | 9/2014 | Sadasivam | H04N 5/23245 348/207.99 |
| 2017/0150038 A1* | 5/2017 | Papakipos | H04N 5/23219 |

* cited by examiner

[Fig. 1]
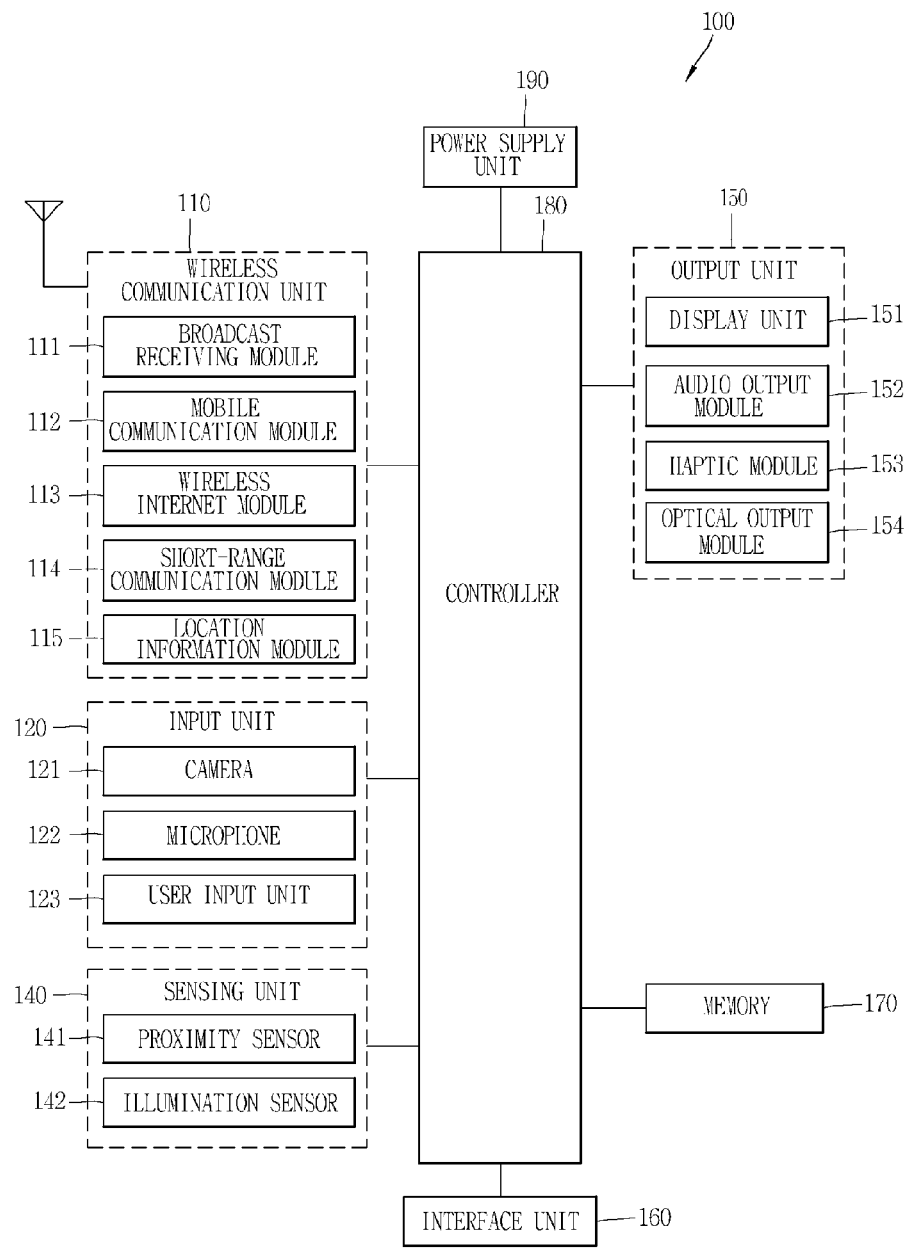

[Fig. 2a]
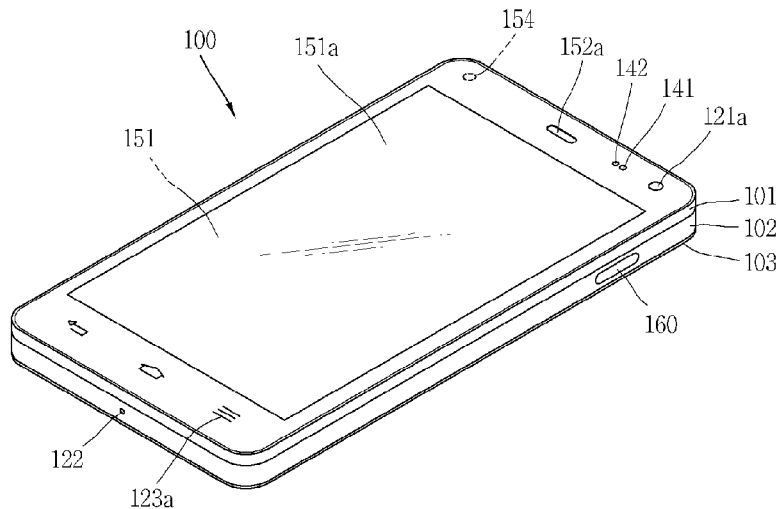
[Fig. 2b]
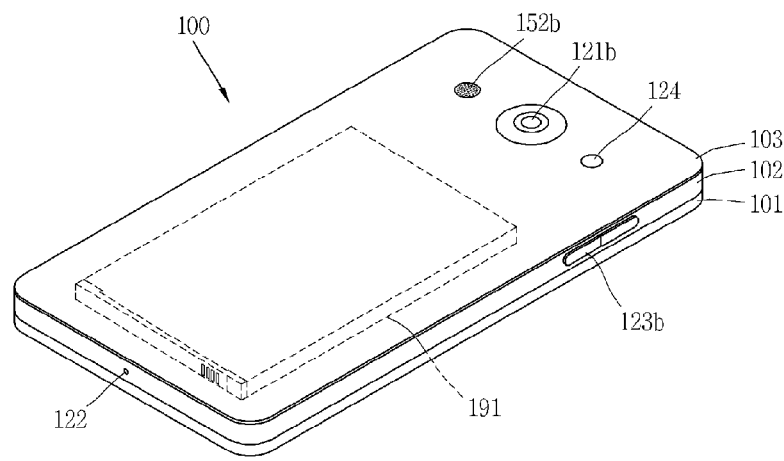
[Fig. 3]
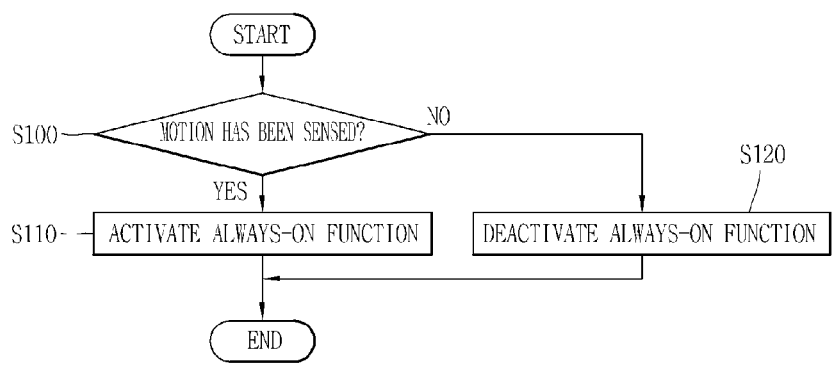

[Fig. 4a]
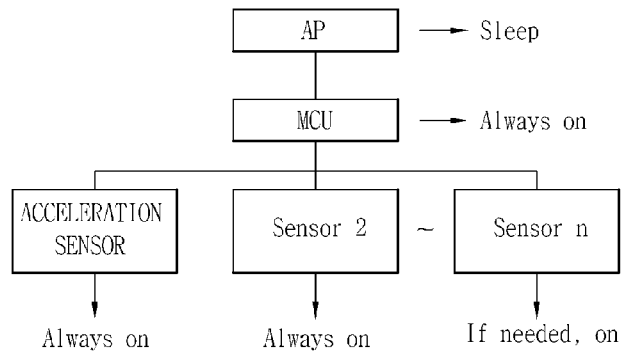
[Fig. 4b]
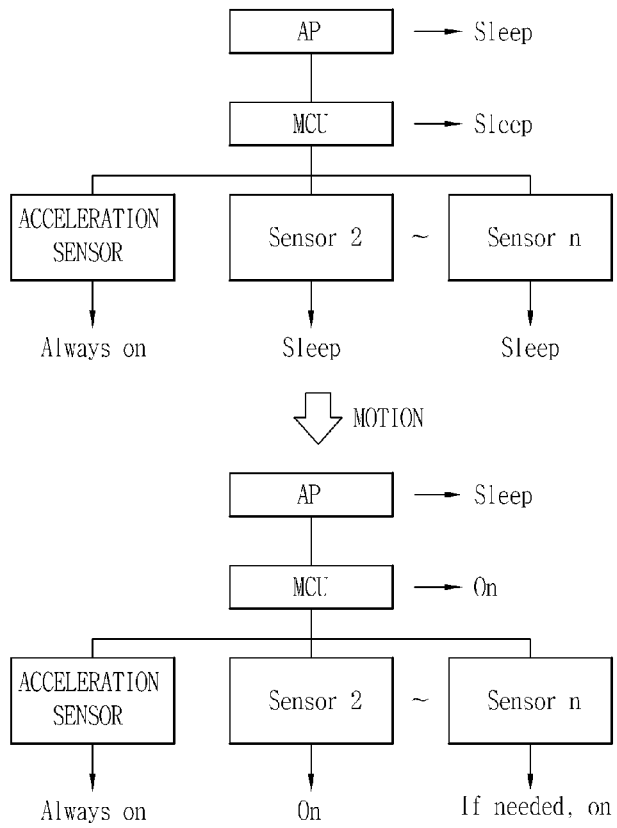

[Fig. 5]
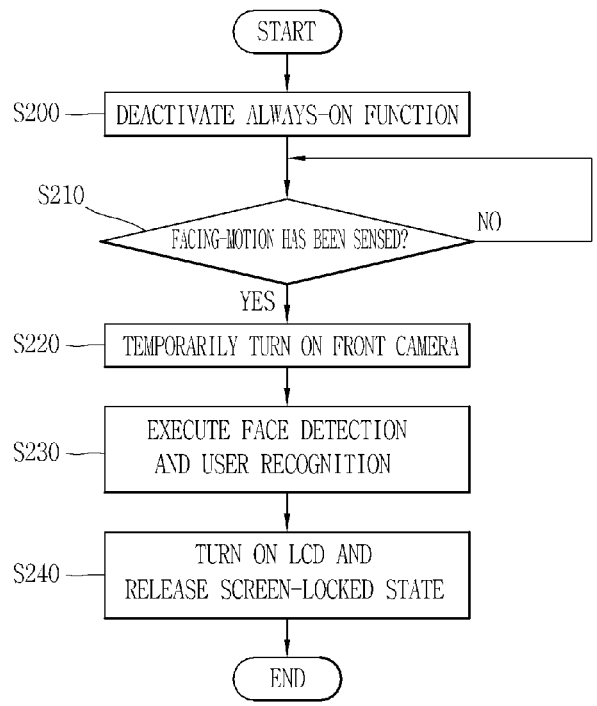

[Fig. 6]
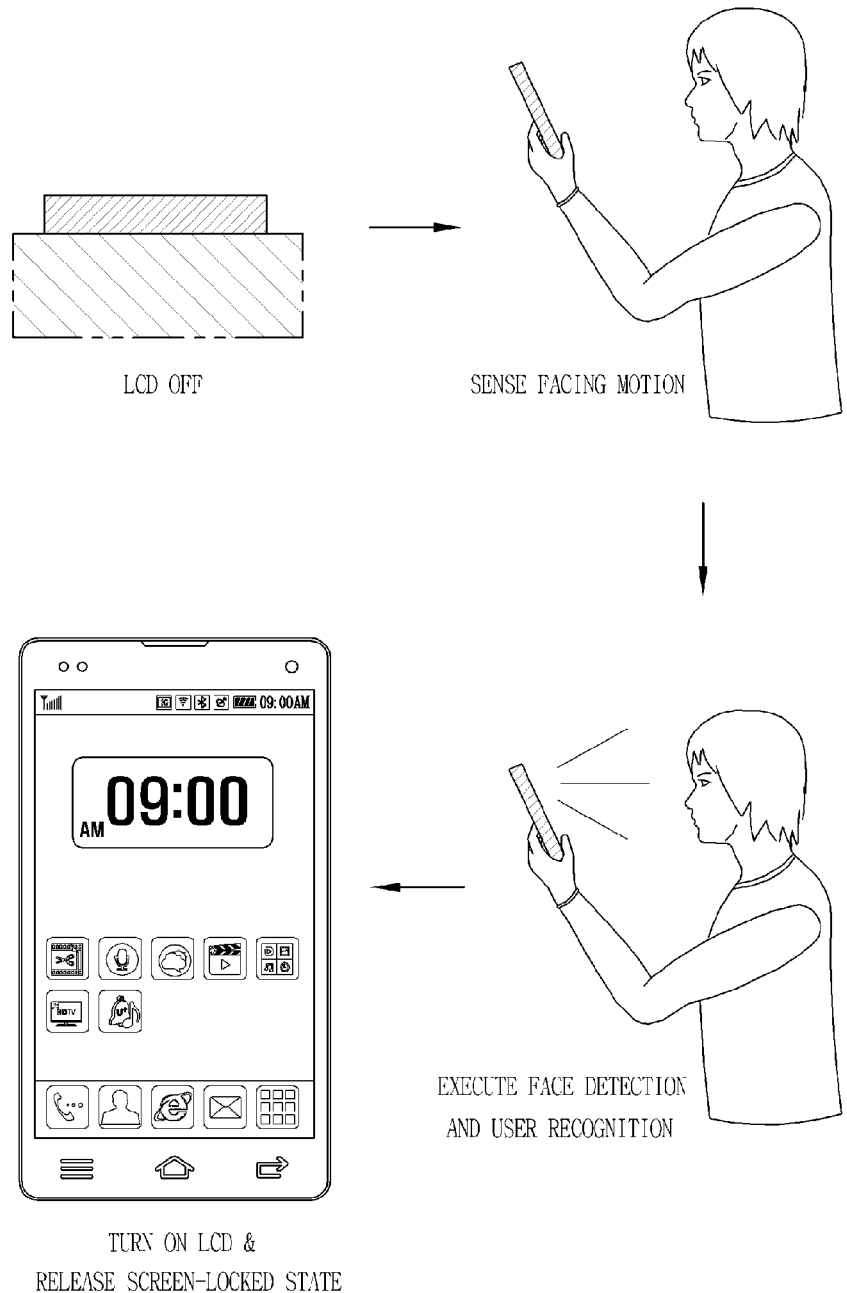

[Fig. 7]
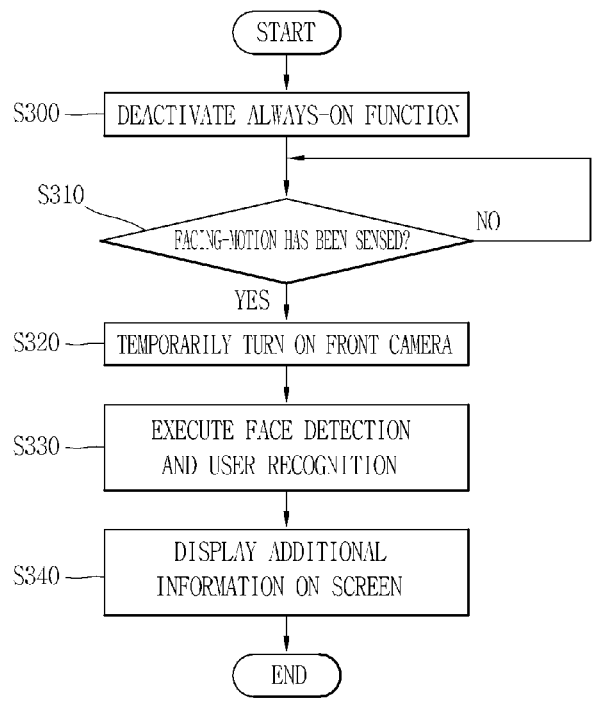

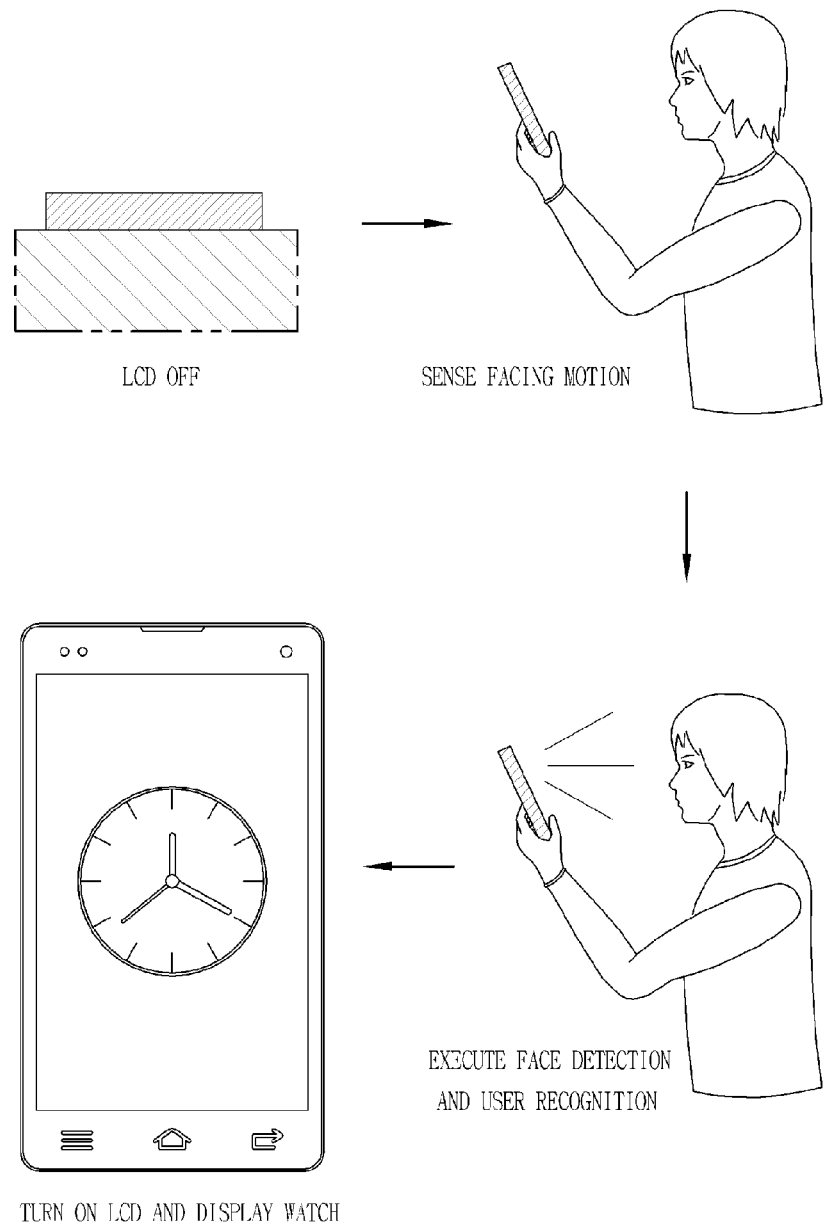
[Fig. 8]

[Fig. 9]
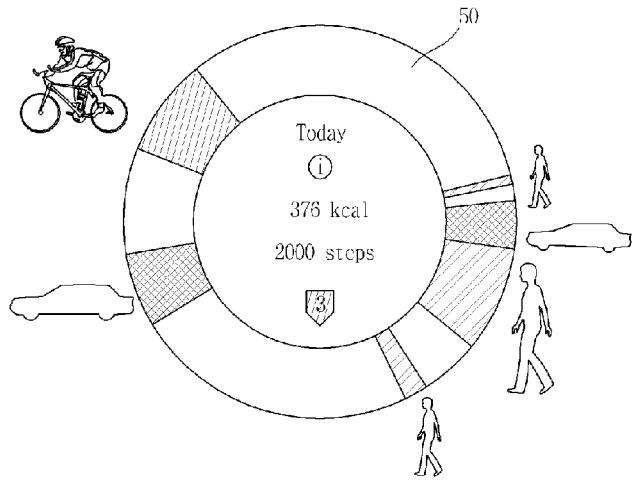
[Fig. 10]
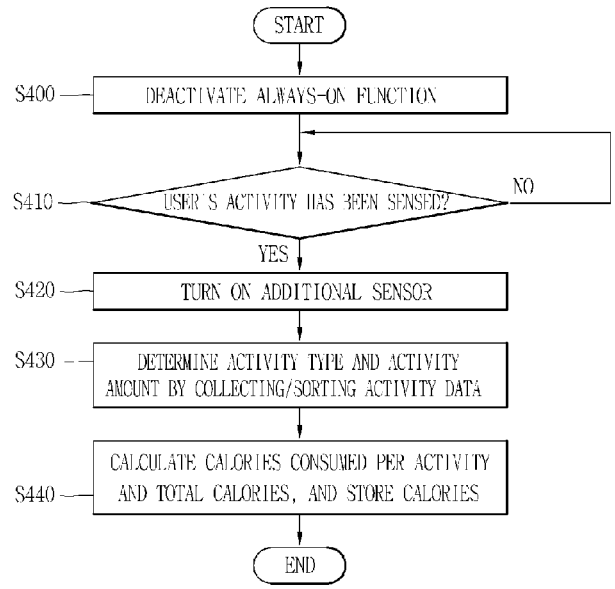
[Fig. 11]
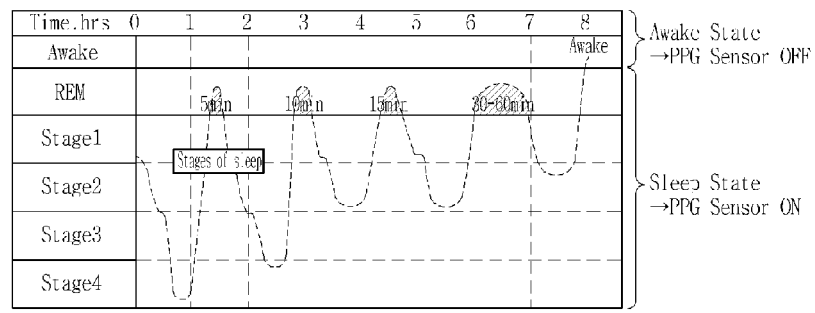

[Fig. 12]
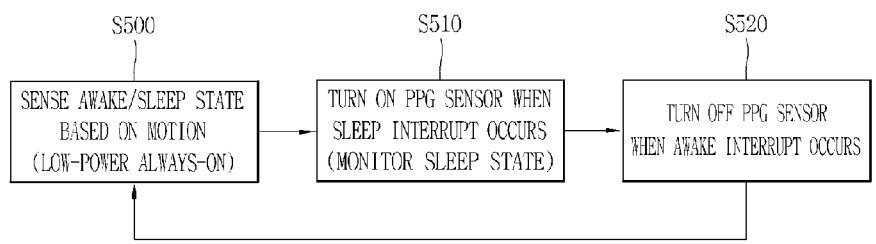
[Fig. 13]
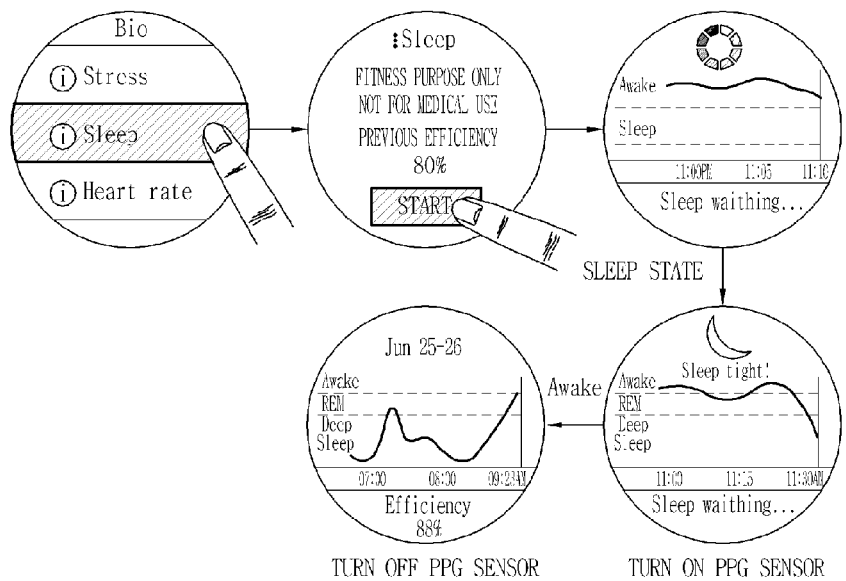

[Fig. 14]
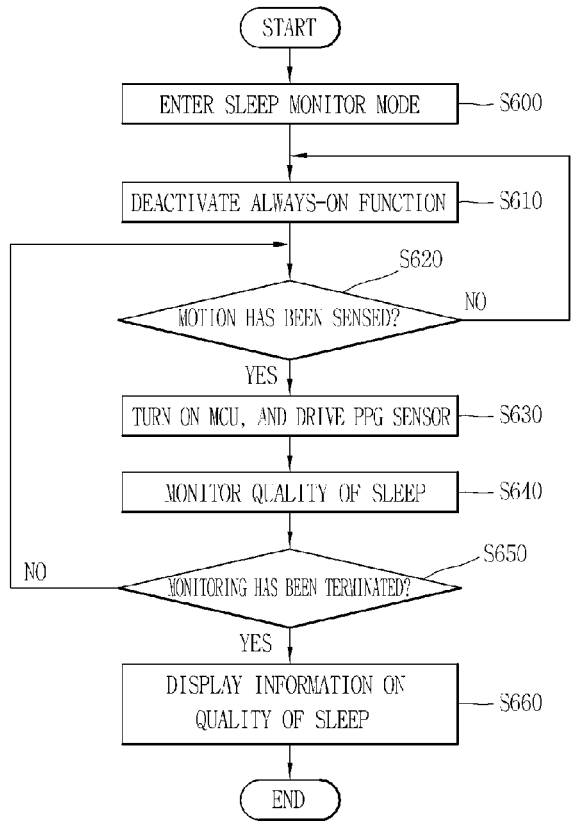
[Fig. 15]
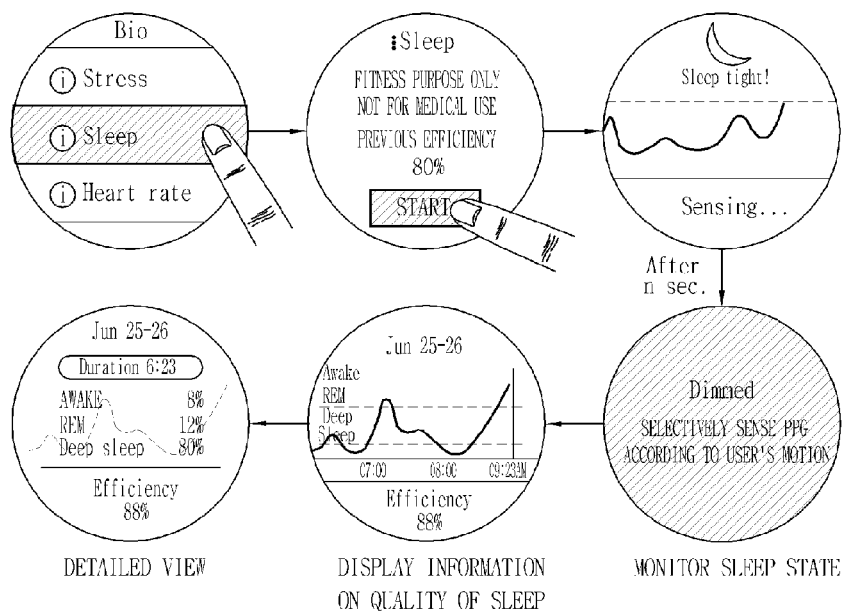

[Fig. 16]
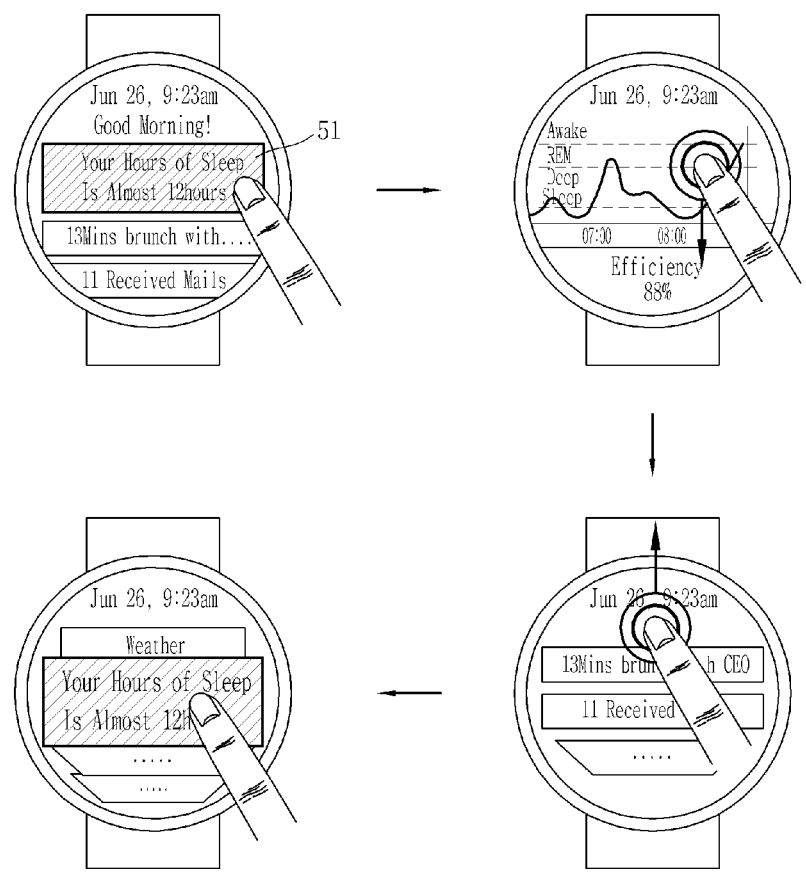

[Fig. 17]
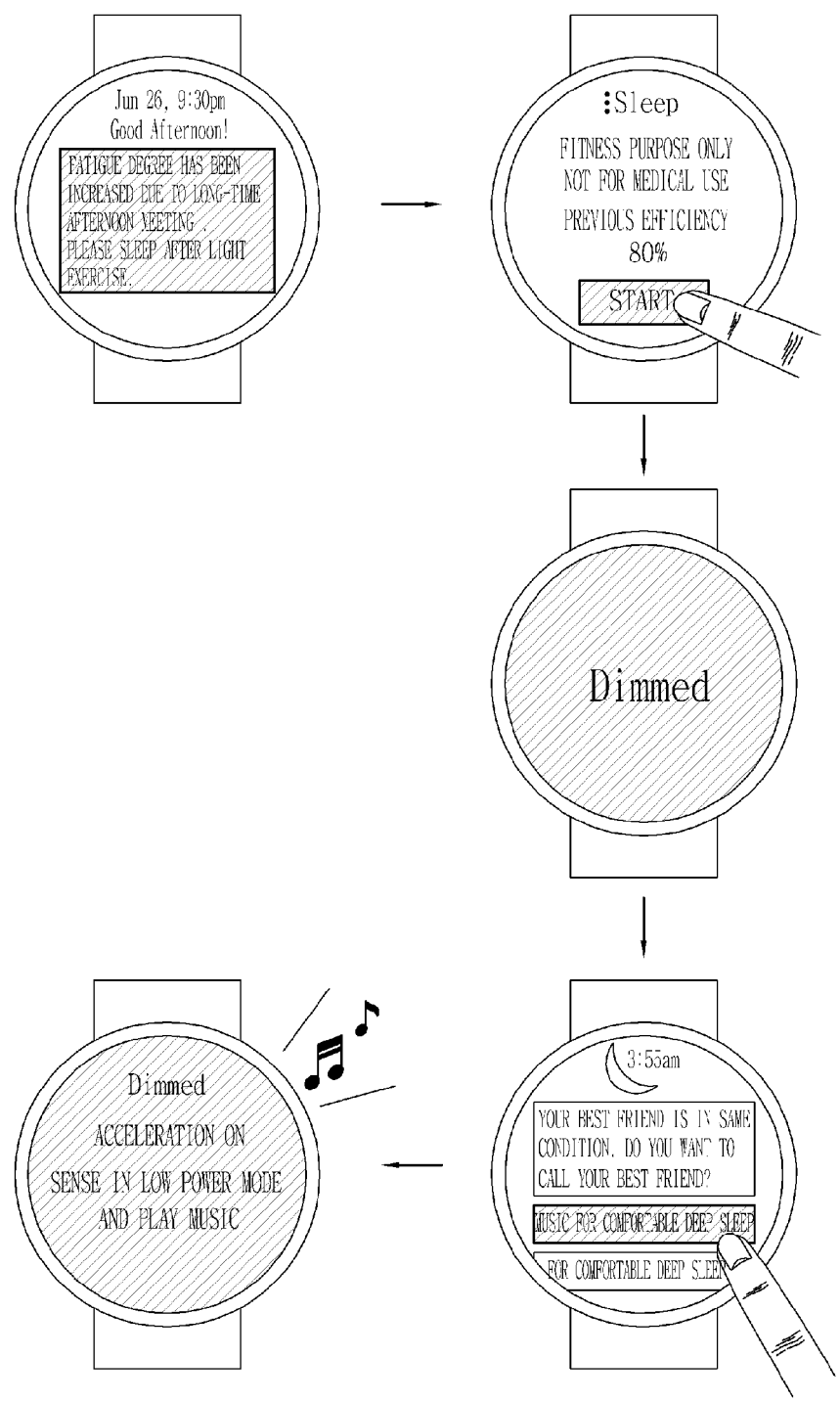

[Fig. 18]
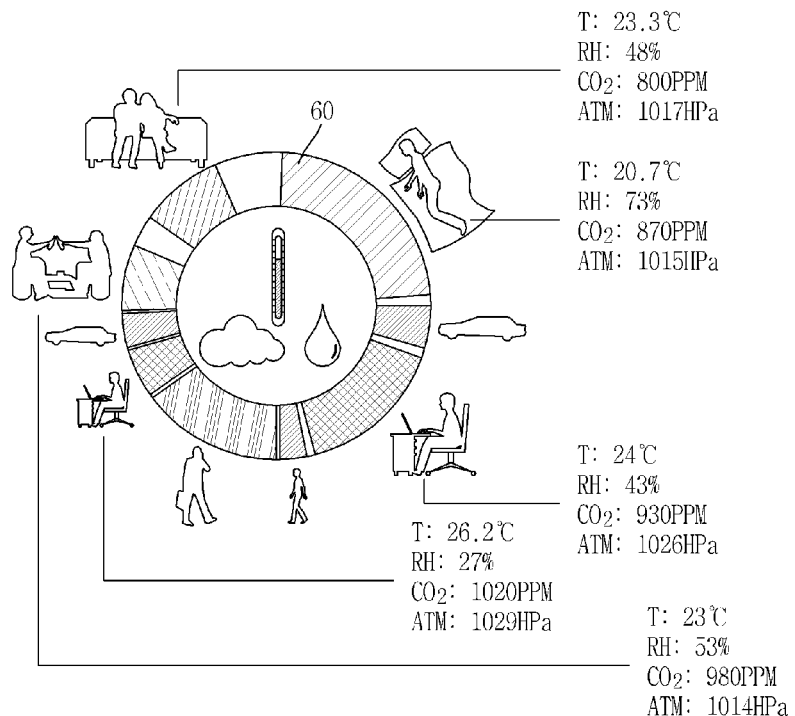
[Fig. 19]
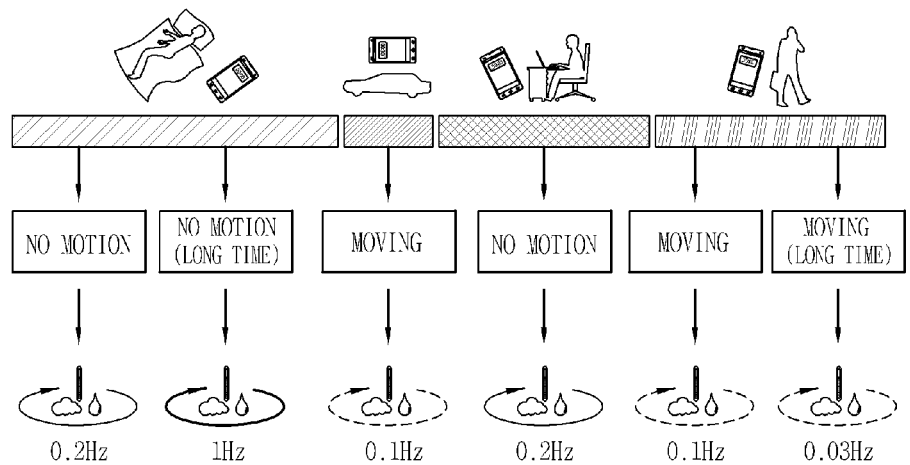

[Fig. 22]
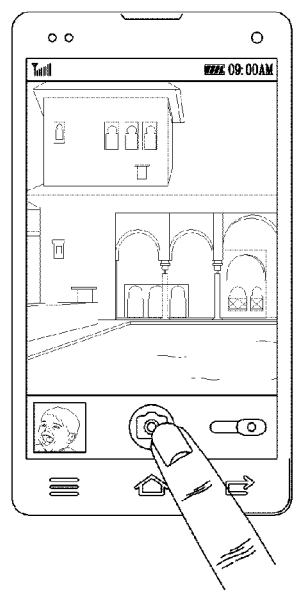  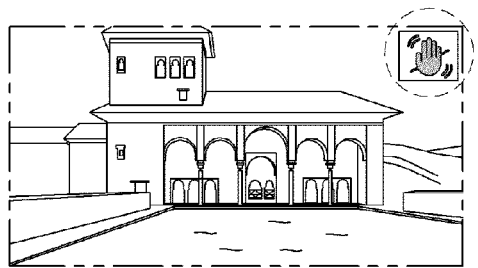
QIS ON
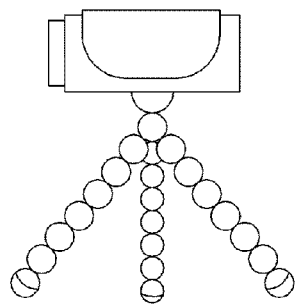  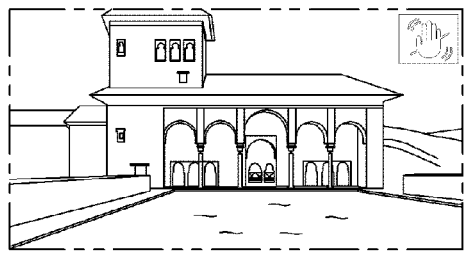
QIS OFF

[Fig. 23]
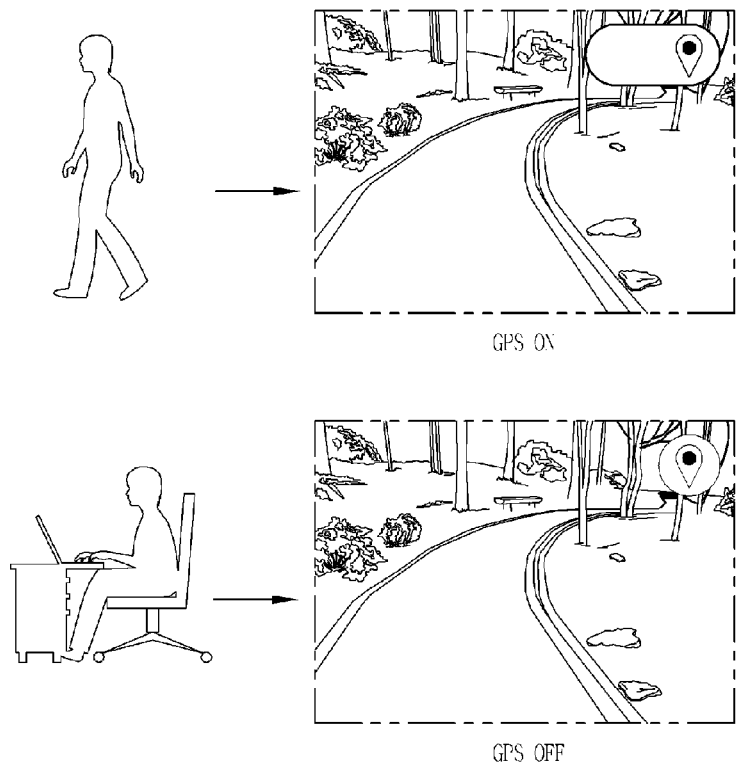
[Fig. 24]
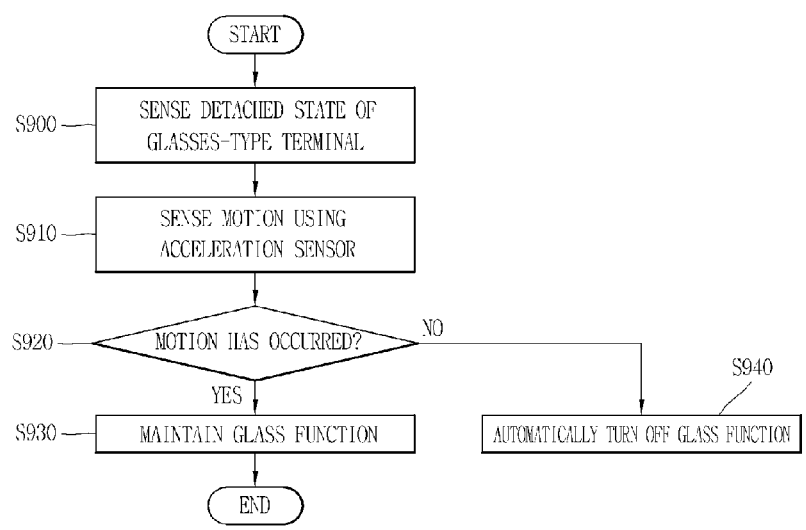

[Fig. 25]
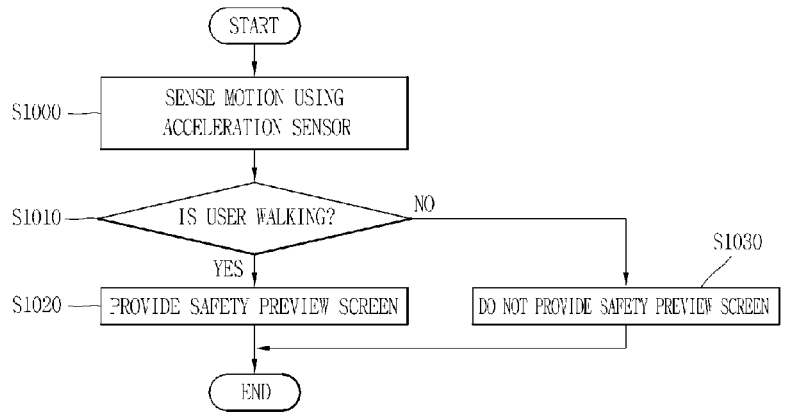
[Fig. 26]
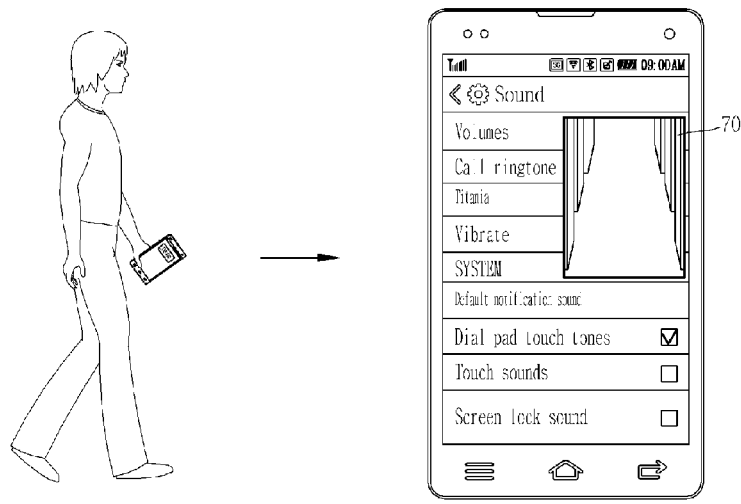
[Fig. 27]
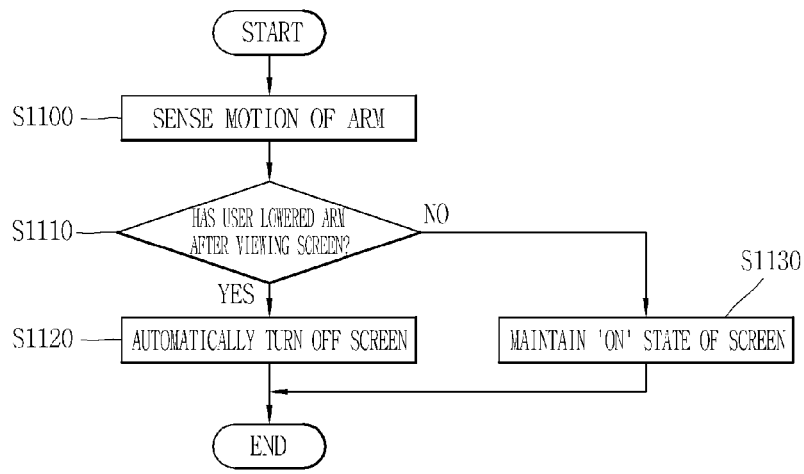

[Fig. 28]
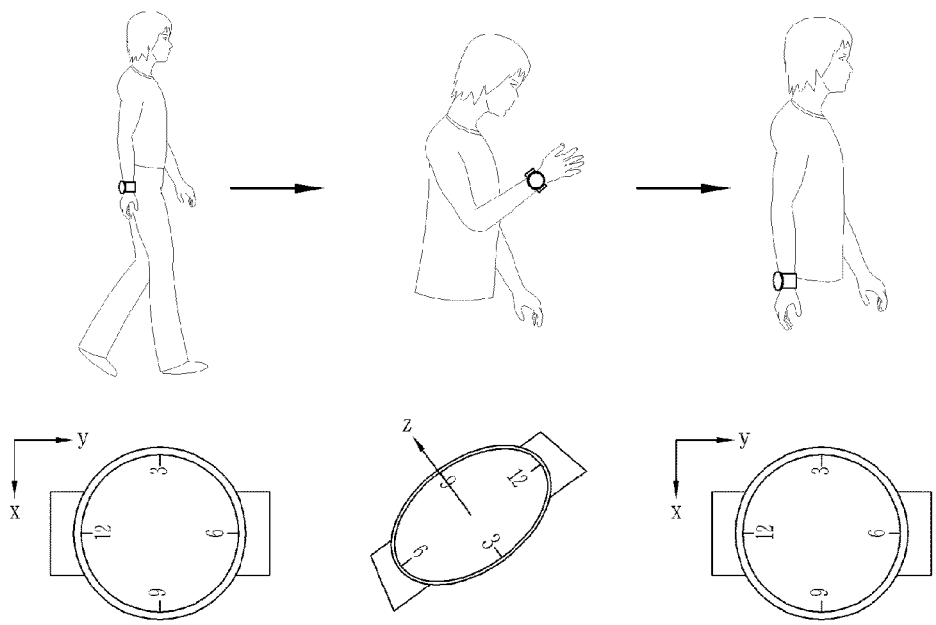

MOBILE TERMINAL AND MOTION-BASED LOW POWER IMPLEMENTING METHOD THEREOF

CROSS REFERENCE TO RELATED APPLICATIONS

This application is the National Phase of PCT International Application No. PCT/KR2015/004941, filed on May 18, 2015, which claims priority under 35 U.S.C. 119(a) to Patent Application No. 10-2014-0125142, filed in Republic of Korea on Sep. 19, 2014, all of which are hereby expressly incorporated by reference into the present application.

TECHNICAL FIELD

The present invention relates to a mobile terminal capable of reducing power consumption of an always-on function based on a motion (movement), and a motion-based low power implementing method thereof.

BACKGROUND ART

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As a mobile device is recently provided with an always-on function, various always-on features are implemented as core functions of the mobile device. To this end, a sensor hub is introduced to implement such always-on features.

Once the always-on function is activated, an acceleration sensor, a micro control unit (MCU) and an additional sensor maintain an 'on' state so that a user's input may be always sensed even in an LCD-off state.

DISCLOSURE OF INVENTION

Technical Problem

However, since the always-on function is always driven, a quiescent current of a predetermined amount (about 1.65 mA/hour) is continuously consumed by the acceleration sensor, the additional sensor and the MCU.

Thus, how to implement the always-on function which consumes current all the times with a low power, may be a very important factor to determine a standby time (waiting time) for use of the mobile device. Further, in a wearable device where a battery of a small capacity is mounted, implementing such an always-on function with a low power may be more important.

Solution to Problem

Therefore, an object of the present invention is to provide a mobile terminal capable of minimizing power consumption by selectively driving an always-on function based on a motion, and a motion-based low power implementing method thereof.

Another object of the present invention is to provide a mobile terminal capable of reducing power consumption by automatically turning on or off a screen through recognition of a user's behavior, and a motion-based low power implementing method thereof.

Still another object of the present invention is to provide a mobile terminal capable of performing various types of functions with a low power, based on a motion of a user, and a motion-based low power implementing method thereof.

To achieve these and other advantages and in accordance with the purpose of the present invention, as embodied and broadly described herein, there is provided a motion-based low power implementing method of a mobile terminal, the method including: sensing a motion of a user by using an acceleration sensor in a low-power always-on that only the acceleration sensor is activated; selectively activating an always-on function according to the sensed motion and automatically deactivating the always-on function and entering the low-power always-on function when no motion is sensed in a always-on state.

In an embodiment of the present invention, the step of selectively activating an always-on function includes: checking a type of the sensed motion; if the sensed motion type is a facing motion to take the mobile terminal toward a face, detecting a face by temporarily driving a camera; authenticating a user of the detected face; and when the user authentication is completed, automatically turning on a screen and releasing a screen-locked state.

In another embodiment of the present invention, the step of selectively activating an always-on function may include: checking a type of the sensed motion; if the checked motion type is a facing motion to take the mobile terminal toward a face, detecting a face by temporarily driving a camera; authenticating a user of the detected face; and when the user authentication is completed, displaying a watch image or notification information indicating reception of an email and a call, in a screen-off state.

In still another embodiment of the present invention, the step of selectively activating an always-on function may include: checking a motion type based on a sensing value sensed by the acceleration sensor; and if the checked motion type is walking, displaying a safety preview on one side of a screen.

In an embodiment of the present invention, in the step of automatically deactivating the always-on function, if a user's activity is not sensed while a user's activity amount is measured by a sensor, the sensor may be deactivated not to measure the activity amount.

In still another embodiment of the present invention, the step of selectively activating an always-on function may include: determining a sleep type based on the sensed motion; and controlling quality of sleep not to be measured if the determined sleep type corresponds to an awake state, but to be measured if the determined sleep type corresponds to a sleep state.

The motion-based low power implementing method of a mobile terminal may further include controlling the activated always-on function based on a motion of a user.

In an embodiment of the present invention, the step of controlling the always-on function may include checking an important degree of measurement data at a current position, based on a continuous state of the sensed motion; and adaptively controlling a measurement period of environmental data according to the checked important degree of the measurement data.

In another embodiment of the present invention, the step of controlling the always-on function may include primarily determining a screen-off time according to whether an approaching object is sensed in a screen-on state; and secondarily determining a screen-off time according to whether a motion is sensed if no approaching object is sensed. The screen-off time may be controlled to be longest when a motion is sensed, and to be shortest when an approaching object is sensed.

In another embodiment of the present invention, the step of automatically deactivating the always-on function may be a step of temporarily releasing the always-on function being currently executed if no motion occurs, and may include a Bluetooth function, a handshake preventing function, and a GPS function.

In still another embodiment of the present invention, the step of automatically deactivating the always-on function may include sensing a detached state of a glasses-type terminal; if the glasses-type terminal is detached, sensing a motion of the glasses-type terminal; and if no motion of the glasses-type terminal occurs, automatically deactivating a glasses-function.

In still another embodiment of the present invention, the step of automatically deactivating the always-on function may include determining a wrist position of a user who is wearing a smart watch, based on a sensing value sensed by the acceleration sensor; and if the determined position of the wrist is a not a position to view a screen, automatically turning off the screen.

To achieve these and other advantages and in accordance with the purpose of the present invention, as embodied and broadly described herein, there is also provided a mobile terminal, including: an acceleration sensor configured to sense a motion of a user in a low-power always-on state that only the acceleration sensor is activated; and a controller configured to selectively activate an always-on function by being turned on/off according to the sensed motion, wherein the controller activates a always-on function when a motion of a user is sensed; and automatically deactivates the always-on function if no motion is sensed and enters from a always-on state to the low-power always-on state.

The controller may perform a face detection and a face authentication by temporarily driving a camera If the sensed motion is a facing motion to take the mobile terminal toward a face. If the face authentication is completed, the controller may automatically turn on a screen and may release a screen-locked state.

The controller may perform a face detection and a face authentication by temporarily driving a camera If the sensed motion is a facing motion to take the mobile terminal toward a face. If the face authentication is completed, the controller may display a watch image or notification information indicating reception of an email and a call, in a screen-off state.

The controller may check a motion type based on a sensing value sensed by the acceleration sensor, and may display a safety preview on one side of a screen if the checked motion type is walking.

The controller may turn off the sensor not to measure the activity amount of a user when a user's activity is not sensed while a user's activity amount is measured by a sensor.

The controller may determine a sleep type based on the sensed motion, and may control quality of sleep not to be measured if the determined sleep type corresponds to an awake state, but to be measured if the determined sleep type corresponds to a sleep state.

The controller may check an important degree of measurement data at a user's current position, based on a continuous state of the sensed motion, and may adaptively control a measurement period of environmental data according to the checked important degree of the measurement data.

The controller may primarily determine a screen-off time according to whether an approaching object is sensed in a screen-on state, and secondarily determine a screen-off time according to whether a motion is sensed if no approaching object is sensed. The screen-off time may be controlled to be longest when a motion is sensed, and to be shortest when an approaching object is sensed.

The controller may automatically turn off a glasses-function, if no motion of a glasses-type terminal is sensed, in a detached state of the glasses-type terminal.

The controller may determine a wrist position of a user who is wearing a smart watch, based on a sensing value sensed by the acceleration sensor. If the determined position of the wrist is a not a position to view a screen, the controller may automatically turn off the screen.

Advantageous Effects of Invention

The present invention can have the following advantages.

Firstly, an always-on function performed at the mobile terminal based on a motion of a user or the mobile terminal is implemented with a low power. This can prolong lifespan of a battery of the mobile terminal and a wearable device.

Secondly, since the screen is automatically turned on/off as a user's behavior is recognized, a wake-up operation can be performed without a user's direct input to the mobile terminal (e.g., a finger contact onto the screen, and pressing of a power/home button). Further, unnecessary power consumption due to a screen-on state can be reduced.

BRIEF DESCRIPTION OF DRAWINGS

FIG. 1 is a block diagram illustrating a mobile terminal according to the present invention;

FIGS. 2A and 2B are conceptual views illustrating an example of a mobile terminal according to the present invention, which are viewed from different directions;

FIG. 3 is a flowchart illustrating a motion-based low power implementing method according to the present invention;

FIGS. 4A and 4B are views comparing an activated state of the conventional always-on function, with a selectively-activated state of an always-on function according to the present invention;

FIG. 5 is a flowchart illustrating a motion-based low-power smart wake-up operation according to the present invention;

FIG. 6 is a view illustrating a detailed embodiment of FIG. 5;

FIG. 7 is a flowchart illustrating an operation to check additional information based on a motion according to the present invention;

FIG. 8 is a view illustrating a detailed embodiment of FIG. 7;

FIG. 9 is a view illustrating an example of an activity monitor screen displayed on a wearable device;

FIG. 10 is a flowchart illustrating a method of motion-based low-power activity monitoring;

FIG. 11 is a graph illustrating a general sleep state;

FIG. 12 is a flowchart illustrating a first embodiment of motion-based low-power sleep monitoring according to the present invention;

FIG. 13 is a view illustrating a detailed embodiment of FIG. 12;

FIG. 14 is a flowchart illustrating a second embodiment of motion-based low-power sleep monitoring according to the present invention;

FIG. 15 is a view illustrating a detailed embodiment of FIG. 14;

FIG. 16 is a view illustrating another embodiment to display information on sleep quality;

FIG. 17 is a view illustrating an embodiment to provide a sleep guide according to activity monitoring in accordance with the present invention;

FIG. 18 is a view illustrating an example of an environment sensor monitoring screen according to the present invention;

FIG. 19 is a view illustrating an embodiment to monitor motion-based low-power environment data according to the present invention;

FIGS. 22 to 24 are views illustrating a method of controlling various functions based on a motion according to the present invention;

FIG. 25 is a view illustrating an embodiment to provide a low-power safety preview for pedestrian, based on a motion according to the present invention;

FIG. 26 is a view illustrating a detailed embodiment of FIG. 25;

FIG. 27 is a view illustrating an embodiment to automatically turn off a low-power screen based on a motion according to the present invention; and FIG. 28 is a view illustrating change of an acceleration value according to a position of an arm.

MODE FOR THE INVENTION

Figure 20:
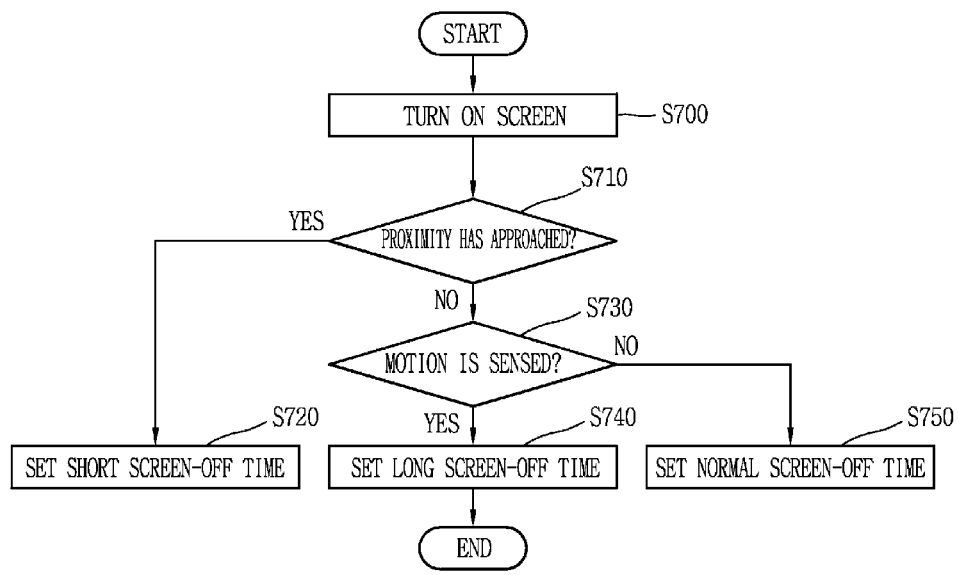
FIG. 20 is a flowchart illustrating an embodiment to control a screen-off time based on a motion according to the present invention.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Reference is now made to FIG. 1 and FIGS. 2A and 2B, where FIG. 1 is a block diagram of a mobile terminal in accordance with the present disclosure, and FIGS. 2A and 2B are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

The mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1, or activating application programs stored in the memory 170. As one example, the controller 180 controls some or all of the components illustrated in FIG. 1 according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the above components may operate in a cooperating manner, so as to implement an operation or a control method of a glass type terminal according to various embodiments to be explained later. The operation or the control method of the glass type terminal may be implemented on the glass type terminal by driving at least one application program stored in the memory 170.

Referring still to FIG. 1, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be implemented using a server or system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user?s fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 2A and 2B, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 2A and 2B depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIGS. 2A and 2B illustrate the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user?s fingerprint. The controller 180 can then use fingerprint information sensed by the finger scan sensor as part of an authentication procedure. The finger scan sensor may also be installed in the display unit 151 or implemented in the user input unit 123.

The second camera 121b is shown located at the rear side of the terminal body and includes an image capturing direction that is substantially opposite to the image capturing direction of the first camera unit 121a.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

A flash 124 is shown adjacent to the second camera 121b. When an image of a subject is captured with the camera 121b, the flash 124 may illuminate the subject.

The second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

A communication system which is operable with the variously described mobile terminal 100 will now be described in more detail.

Such a communication system may be configured to utilize any of a variety of different air interfaces and/or physical layers. Examples of such air interfaces utilized by the communication system include Frequency Division Multiple Access (FDMA), Time Division Multiple Access (TDMA), Code Division Multiple Access (CDMA), Universal Mobile Telecommunications System (UMTS) (including, Long Term Evolution (LTE), LTE-A (Long Term Evolution-Advanced)), Global System for Mobile Communications (GSM), and the like.

By way of a non-limiting example only, further description will relate to a CDMA communication system, but such teachings apply equally to other system types including a CDMA wireless communication system as well as OFDM (Orthogonal Frequency Division Multiplexing) wireless communication system.

A CDMA wireless communication system generally includes one or more mobile terminals (MT or User Equipment, UE) 100, one or more base stations (BSs, NodeB, or evolved NodeB), one or more base station controllers (BSCs), and a mobile switching center (MSC). The MSC is configured to interface with a conventional Public Switched Telephone Network (PSTN) and the BSCs. The BSCs are coupled to the base stations via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs can be included in the CDMA wireless communication system.

Each base station may include one or more sectors, each sector having an omni-directional antenna or an antenna pointed in a particular direction radially away from the base station. Alternatively, each sector may include two or more different antennas. Each base station may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In some cases, the term "base station" may be used to refer collectively to a BSC, and one or more base stations. The base stations may also be denoted as "cell sites." Alternatively, individual sectors of a given base station may be referred to as cell sites.

A broadcasting transmitter (BT) transmits a broadcast signal to the mobile terminals 100 operating within the system. The broadcast receiving module 111 of FIG. 1 is typically configured inside the mobile terminal 100 to receive broadcast signals transmitted by the BT.

Global Positioning System (GPS) satellites for locating the position of the mobile terminal 100, for example, may cooperate with the CDMA wireless communication system. Useful position information may be obtained with greater or fewer satellites than two satellites. It is to be appreciated that other types of position detection technology, (i.e., location technology that may be used in addition to or instead of GPS location technology) may alternatively be implemented. If desired, at least one of the GPS satellites may alternatively or additionally be configured to provide satellite DMB transmissions.

The present invention provides a method capable of minimizing power consumption due to always-on functions, by activating the always-on functions according to a motion of a user or a device.

The always-on function includes various types of functions performed by a micro control unit (MCU) and additional sensors. For instance, the always-on function may be applied to smart wake-up for turning on an LCD, activity monitoring for monitoring a user?s activity, and sleep monitoring for measuring quality of sleep. The always-on function may be also applicable to a function set in a predetermined mode, as well as an environment monitoring function, a handshake preventing function, a GPS function and a screen-off function.

For this, in the present invention, the always-on function is selectively activated as a motion is sensed by an acceleration sensor. For instance, in the present invention, if no motion is sensed in an LCD-off state, a device performs a low-power always-on function. On the other hand, if a motion is sensed, the low-power always-on function is converted into a normal always-on function. For instance, only when a size of an output value of an acceleration sensor exceeds a predetermined threshold value, the low-power always-on function may be converted into a normal always-on function.

Hereinafter, the normal always-on function is called an always-on function for convenience.

The acceleration sensor is configured to sense a horizontal motion and a vertical motion of the mobile terminal or a wearable device, based on a gravity acceleration applied to X, Y and Z axes.

The motion may include a motion of a user, the mobile terminal or a wearable device. For sensing a motion, the acceleration sensor maintains an 'on' state, even in a deactivated state of an always-on function (i.e., in a low-power always-on state).

FIG. 3 is a flowchart illustrating a motion-based low power implementing method according to the present invention.

As shown in FIG. 3, a motion of a user or the mobile terminal is sensed by an acceleration sensor (S100). If the motion is sensed, an always-on function, set to be activated only when a predetermined condition is satisfied, is activated (S110). On the other hand, if no motion is sensed, the always-on function is not activated (S120).

That is, even if conditions to activate the always-on function are satisfied, if a motion of a user or the mobile terminal is not sensed, the always-on function is not activated, but a low-power always-on function (state) is performed.

Thus, unlike in the conventional art, the always-on functions of the present invention are not always activated under predetermined conditions. Rather, the always-on functions of the present invention are selectively activated according to whether a motion has occurred or not. This can reduce power consumption. That is, if a motion is sensed by an acceleration sensor, a micro control unit (MCU) and a predetermined sensor are operated by a sensing signal. The MCU may be implemented as the controller 180.

FIGS. 4A and 4B are views comparing a method of activating an always-on function according to the conventional art, with a method of activating an always-on function according to the present invention.

As shown in FIG. 4A, the conventional always-on function always maintains an activated state in an LCD-off state, and the MCU and the acceleration sensor are always driven so as to sense a predetermined input (e.g., knock-knock gesture). Additional sensors are operated to check additional characteristics of the input.

Thus, in the conventional art, an MCU and an acceleration sensor are always driven for an always-on function. This may cause a predetermined amount of current to be consumed regardless of a motion of a user.

On the other hand, in the present invention, as shown in FIG. 4B, the always-on function is activated/deactivated according to a motion of a device, even in an LCD-off state.

In the present invention, when no motion is sensed, a low-power always-on function for driving only an acceleration sensor is performed. This can more reduce power consumption than in the conventional art where an always-on function is performed. For instance, in the conventional art, a quiescent current of +0.9 mA/hour is consumed by an always-on function. However, in the present invention, only a quiescent current of +0.4 mA/hour is consumed when no motion is sensed. This can reduce power consumption into ¼, considering that rock bottom power consumption is 2 mA. By this effect, a standby time can be prolonged by 25%.

Such motion-based selective activation of the always-on function may be applied to various types of operations of the mobile terminal and a wearable device requiring a low power. For instance, the motion-based selective activation of the always-on function may be applied to a smart wake-up function to turn on a screen by sensing a usage time point of the mobile terminal, an activity monitor function to check a user's activity type and calculate calories consumed and a total exercise metabolic rate according to the user's activity type, a sleep monitor function to measure and display quality of sleep, etc.

Hereinafter, various embodiments of a motion-based low-power implementing method according to the present invention will be explained in more detail with reference to the attached drawings.

FIG. 5 is a flowchart illustrating a low-power smart wake-up operation as an embodiment of a motion-based low-power implementing method according to the present invention, and FIG. 6 is a view illustrating a detailed embodiment of FIG. 5.

As shown in FIGS. 5 and 6, if a motion of the mobile terminal is not sensed in an LCD-off state, a low-power always-on function is activated while an always-on function is deactivated (S200). In this state, if a motion of the mobile terminal occurs, the always-on function is activated to turn on the MCU. The MCU recognizes a facing motion, i.e., a user's gesture to take the mobile terminal toward his or her face, by using change of an acceleration value sensed by the acceleration sensor (an acceleration value applied to X, Y and Z axes) (S210). For instance, when a user is holding the mobile terminal, a large acceleration value is applied to X and Y axes of the acceleration sensor. On the other hand, when a user is viewing a screen of the mobile terminal, a large acceleration value is applied to a Z-axis of the acceleration sensor.

Once the facing motion is sensed, the MCU turns on only a front camera temporarily (e.g., five seconds) (S220). Then, the MCU detects a face and recognizes (authenticates) a user by comparing the detected face with a registered face (S230). Thus, the facing motion may provide a precise usage time point of the front camera, as a usage time point of the mobile terminal. For the face detection and the face recognition, a face detection engine and a face recognition engine may be used.

Owing to the steps (S220, S230), power consumption of the mobile terminal can be minimized by temporarily restricting an operation time duration (e.g., five seconds) of a corresponding device, in case of operating the specific device (e.g., camera, audio recorder, etc.) for a user's final confirmation or for a user's authentication with respect to usage of the mobile terminal.

Once a user is recognized (authenticated), the LCD is automatically turned on, and a screen-locked state is released (S240). Owing to the step (S240), complicated procedures (e.g., turning on the LCD of the mobile terminal and releasing a screen-locked state) can be facilitated by turning on a screen and by releasing a locked state of a security screen if necessary, after user authentication.

The present invention is not limited to this. That is, if a security release process is not required, the LCD may be immediately turned on.

As another embodiment, once a face of a user is detected, the LCD may be immediately turned on, and then a security release process may be performed through check of the face.

Thus, in the present invention, once a facing motion is sensed, the camera is activated for a short time to detect a face and to authenticate a user. Then, the LCD is turned on. With such a configuration, power consumption can be minimized, and a wake-up operation can be performed without a direct input to the mobile terminal (e.g., a finger's contact onto a screen, and pressing of a power/home button).

FIG. 7 is a flowchart illustrating an operation to check additional information based on a motion according to the present invention, and FIG. 8 is a view illustrating a detailed embodiment of FIG. 7.

As shown in FIGS. 7 and 8, if no motion of the mobile terminal is sensed in an LCD-off state, a low-power always-on function is activated and an always-on function is deactivated (S300). If a motion of the mobile terminal occurs in this state, the always-on function is activated to operate the MCU. The MCU recognizes a facing motion, i.e., a gesture to take the mobile terminal toward his or her face, by using change of an acceleration value sensed by the acceleration sensor (an acceleration value applied to X, Y and Z axes) (S310). Once the facing motion is sensed, the MCU turns on the front camera of the mobile terminal temporarily (e.g., five seconds) (S320). Then, the MCU detects a face and recognizes (authenticates) a user by comparing the detected face with a registered face (S330).

If the user authentication is completed, the MCU displays an additional information screen on the display unit 151 in an LCD-off state. The additional information screen may display a watch image and notification information (e.g., reception of an email or a call). Thus, a user can easily check various types of additional information without turning on the LCD.

Generally, an activity monitoring function indicates a function to automatically check and record activity types included in a user's schedule by a wearable device worn on a user's wrist (e.g., a smart watch) or a user's smart phone, to calculate calories consumed per activity and a total exercise metabolic rate for one day, to feed back the calculated information to a user, and to recommend a corresponding exercise to the user. The activity monitoring function may be implemented by a pedometer.

FIG. 9 is a view illustrating an example of an activity monitor screen displayed on a wearable device.

Referring to FIG. 9, the activity monitor screen is implemented as a circular time line 50 indicating 24 hours. Icons indicating exercise types (the icons are displayed in the same color when indicating the same exercise), a date, total calories, and the number of steps are displayed at an inner side of the circular time line 50.

FIG. 10 is a flowchart illustrating a method of monitoring a low-power activity based on a motion.

If no motion of a device is sensed, it means that a user is not doing an activity strenuous (hard) enough to influence on an exercise metabolic rate. Thus, a low-power always-on function is activated, and an always-on function is deactivated (S400).

If a user's motion (activity) is strenuous enough to influence on an exercise metabolic rate (S410), the always-on function is activated to turn on the MCU and an additional sensor (e.g., bio-information sensor) (S420). The MCU determines an activity type and an activity amount by collecting/sorting user's activity data by a sensor hub (S430), calculates consumed calories per activity and total calories based on the determined activity type and activity amount (S440).

In the present invention, power consumption can be more reduced than in the conventional art, because required sensors are activated only when a user is doing an activity strenuous enough to influence on an exercise metabolic rate.

A sleep monitoring function indicates a function to measure a user's heart rate while a user is sleeping, by using a heartbeat sensor called a photoplethysmography (PPG) sensor, and to monitor quality of sleep. The PPG sensor is used to measure a heart rate by sensing light reflection which is variable according to flow of blood. The PPG sensor may provide quality of sleep based on a heart rate, or may provide guide information for deep sleep.

FIG. 11 is a graph illustrating a general sleep state.

Referring to FIG. 11, a sleep state is largely classified into a deep sleep state (4 stages), a light sleep state (REM) and an awake state.

In the present invention, unlike in the conventional art, even if the mobile terminal enters a sleep monitoring mode (or sleep mode), the PPG sensor is selectively operated according to an awake/sleep state by a user?s motion, so as to monitor a sleep state. This can reduce power consumption.

The awake/sleep state may be determined based on change of an acceleration value applied to X, Y and Z axes of the acceleration sensor, i.e., a motion of a wrist on which a wearable device is worn. For instance, if a change amount of an acceleration value is larger than a reference value, the mobile terminal is determined to be in an awake state. On the other hand, if a change amount of an acceleration value is smaller than the reference value, the mobile terminal is determined to be in a sleep state.

FIG. 12 is a flowchart illustrating a first embodiment of motion-based low-power sleep monitoring according to the present invention, and FIG. 13 is a view illustrating a detailed embodiment of FIG. 12.

In this embodiment, even if a user sets a sleep mode, PPG sensing is performed only in a substantial sleep state (a deep sleep state or a REM state), for reduction of power consumption. That is, an always-on function is not performed in an awake state, but it is performed only in a sleep state so that a sleep state may be measured by the MCU and the PPG sensor.

Referring to FIGS. 12 and 13, a low-power always-on function is activated and an always-on function is deactivated, from a time point when a user has started to operate a sleep monitoring mode (e.g., 11:00 PM), to a time point when the user has woken up. In this instance, the acceleration sensor senses an acceleration value by a motion of a user who wears a wearable device, and outputs the acceleration value.

The MCU may be interrupted according to a size of the acceleration value sensed by the acceleration sensor, thereby determining whether a user is currently in an awake state or a sleep state (S500). That is, the acceleration value may be used as a sleep interrupt of the MCU. If a sleep interrupt occurs as a user falls asleep at 11:30 PM, an always-on function to turn on the MCU is activated. The MCU monitors a sleep state by turning on the PPG sensor (S510).

If a user wakes up momentarily during the sleep monitoring, or if the user wakes up in the morning, an output value of the acceleration sensor is increased and thus an awake interrupt occurs. As the awake interrupt occurs, the MCU and the PPG sensor are deactivated, so that an always-on state is converted into a low power always-on state (S520).

In the present invention, once a sleep monitoring mode is set, the MCU is activated based on a motion according to an awake state or a sleep state, for PPG sensing. On the contrary, in the conventional art, the MCU is always activated for PPG sensing. Thus, in the present invention, the amount of current required to monitor a sleep state can be reduced.

Quality of sleep, as well as a sleep state may be determined based on a user's motion, i.e., output of the acceleration sensor. However, quality of sleep, determined only based on output of the acceleration sensor, may not be precise, because the quality of sleep is categorized into a plurality of stages as shown in FIG. 11. Thus, PPG sensing is used to enhance precision in measuring quality of sleep.

As aforementioned, it is disadvantageous in the aspect of power saving, to always drive the MCU and the PPG sensor in a sleep state like in the conventional art. The reason is because quality of sleep is not greatly influenced by driving of the PPG sensor, since a motion scarcely occurs in a deep sleep state where an output value of the acceleration sensor is almost the same.

Thus, in the present invention, an always-on function is deactivated in a sleep state (low-power always-on function is activated). The always-on function is activated whenever a user's motion is sensed, thereby driving the PPG sensor. This can reduce the amount of current required to perform sleep state monitoring.

FIG. 14 is a flowchart illustrating a second embodiment of motion-based low-power sleep monitoring according to the present invention, and FIG. 15 is a view illustrating a detailed embodiment of FIG. 14.

As shown in FIGS. 14 and 15, a user may select a sleep monitoring mode (or sleep mode), from a menu. Once the mobile terminal enters the sleep monitoring mode, an always-on function is activated in an awake state, so that PPG sensing is performed (S600). Then, if the awake state is converted into a sleep state, the always-on function is deactivated, so that a low power always-on function for driving only the acceleration sensor is activated (S610). That is, a normal always-on state is converted into a low-power always-on state.

The acceleration sensor outputs an acceleration value based on a motion of a user, and the PPG sensor is selectively driven as the MCU is activated/deactivated (triggered) according to the acceleration value. That is, a low-power always-on function is maintained in a deep sleep state where a user's motion scarcely occurs. The low-power always-on function is converted into a normal always-on function when a motion occurs, so that the MCU is activated and the PPG sensor is operated (S620, S630).

In another embodiment, an on/off period of the PPG sensor may be controlled in a smart manner, based on a user's motion. For instance, a sensing period of the PPG sensor may be set to be long in a deep sleep state where a user's motion scarcely occurs. On the other hand, the sensing period of the PPG sensor may be set to be short in a light sleep state where a user's motion occurs much.

Thus, a user's sleep state is monitored based on an output value of the acceleration sensor, and based on a sensing value of the PPG sensor (S640).

Such an operation is repeatedly performed until when the sleep monitoring mode is terminated, and information on quality of sleep is displayed on the screen when the sleep monitoring mode is terminated (S650, S660).

The information on quality of sleep includes not only a user's sleep efficiency, but also change of a sleep state (awake, REM sleep and deep sleep) according to lapse of time. A user may precisely check quality of sleep through a detailed view.

As aforementioned, in the present invention, PPG monitoring is performed while the MCU is activated or deactivated according to a user's motion. Thus, unlike in the conventional art where the MCU is always activated during a sleep state for PPG sensing, the MCU is activated according to a user's motion in the present invention. More specifically, in the present invention, a time point when PPG sensing is required is checked based on an acceleration value, and PPG sensing is performed only at the time point. This can reduce the amount of current required to monitor a sleep state.

FIG. 16 is a view illustrating another embodiment to display information on sleep quality.

As shown in FIG. 16, information on a measured quality of sleep may be displayed on a pop-up window 51. If a user selects information on quality of sleep from the pop-up window 51, detailed sleep information may be displayed. In this state, if the user swipes down the detailed sleep information, other information may be checked. If the user swipes up part rather than the pop-up window 51, information on all users is displayed in an assembled manner so that the user can check the information by a toggle operation.

FIG. 17 is a view illustrating an embodiment to provide a sleep guide according to activity monitoring in accordance with the present invention.

In the present invention, if it is determined (refer to FIG. 10) that a user's activity amount is larger than an average value, a wearable device may display entering a sleep monitoring mode, on a screen, based on a fatigue value checked during a daytime and a current PPG value, as shown in FIG. 17.

If the mobile terminal is entered to the sleep monitoring mode, a low-power always-on function is performed. If an awake state is sensed based on an output value of the acceleration sensor while the always-on function is performed, the MCU guides a solution for deep sleep. If a user selects a specific solution (e.g., music), the always-on function is deactivated (low-power mode). As a result, music is played while sensing by the acceleration sensor is performed.

Then, if the user wakes up in the morning, information on quality of sleep may be displayed on the screen.

Generally, an environment sensor, a sensor for sensing data related to a user's health such as temperature, humidity, air pressure and air quality, performs recording/monitoring for 24 hours. However, in the conventional art, the environment sensor collects environmental data at the same period, regardless of a place and a motion (getting on a vehicle, walking and outdoor activity) of a user. This may cause continuous consumption of current.

Thus, if power of a plurality of sensors, activation of the MCU and an application processor (AP) for data collection/analysis, and a collection period of the environment sensor are determined based on a motion, current consumption can be minimized.

FIG. 18 is a view illustrating an example of an environment sensor monitoring screen according to the present invention.

As shown in FIG. 18, the environment sensor monitoring screen is implemented as a circular time line 60 indicating 24 hours. Icons indicating environment types (the icons are displayed in the same color when indicating the same environment) and a type of collected data are displayed at an inner side of the circular time line 60. Once the icon is selected, a detailed sensing value of the environment sensor may be displayed.

FIG. 19 is a view illustrating an embodiment to monitor motion-based low-power environment data according to the present invention.

Generally, environment sensor data is more important at a place where a user stays for a long time without a motion, whereas it is less important at a place where a motion (e.g., getting on a vehicle, walking and outdoor activity) of a user occurs continuously.

Thus, in the present invention, a data collection period of the environment sensor having an always-on function is controlled in a smart manner based on a motion, thereby executing a user's environment record function with a low power.

That is, as shown in FIG. 19, a period to collect environmental data is increased at a place where a user stays for a long time without a motion, because environment sensor data is more important at the place (e.g., 0.2 Hz→1 Hz).

On the other hand, if a motion of a user or a device occurs continuously, a period to collect environmental data is decreased because environment sensor data is less important and precision by the environment sensor is lowered (e.g. 0.1 Hz→0.03 Hz).

In the present invention, determining the motion and a maintenance time of the motion is executed through comparison with a preset reference value.

In the present invention, connection having power consumption (e.g., Bluetooth), a type of a device (e.g., a gyro sensor, a GPS and a camera), and various functions (e.g., screen-off/lock) may be controlled based on a motion of a user or a device.

FIG. 20 is a flowchart illustrating an embodiment to control a screen-off time based on a motion according to the present invention.

As shown in FIG. 20, if no input has been applied for a predetermined time in a screen-on state, the controller 180 senses whether a predetermined object has approached the mobile terminal or not through the proximity sensor (S700, S710).

If it is sensed that a predetermined object has approached the mobile terminal, it means that the mobile terminal is turned inside out, or that the mobile terminal is positioned in a pocket or a bag. Thus, the controller 180 controls a screen-off time to be shorter than a normal time (S720).

On the other hand, if no input has been applied for a predetermined time and no object has approached the mobile terminal, the controller 180 senses a motion of the mobile terminal by the acceleration sensor (S730). If a motion of the mobile terminal is sensed, the controller 180 controls a screen-off time to be longer than a normal time (S740). On the other hand, if no motion of the mobile terminal is sensed, the controller 180 sets the screen-off time as the normal time (S750).

If no input has been applied for a predetermined time, a screen-off time is primarily controlled by the proximity sensor. If no object has approached the mobile terminal, a motion of the mobile terminal is determined to secondarily control the screen-off time. Under such a configuration, power consumption due to a screen-on state can be reduced when a screen is not used.

In the present invention, controlling only a screen-off time has been explained for convenience. However, controlling a screen-lock time may be performed in the present invention.

In the above embodiment, a screen-off function and a screen-lock function may be provided more flexibly as a motion-based low power implementing method of the present invention is applied to the conventional screen-off/lock function based on a proximity sensor.

A mobile terminal (or a smart phone) and a wearable device (e.g., a smart watch, a glasses-type terminal) may be interworked with each other via Bluetooth. In this case, unnecessary power consumption may be caused because the Bluetooth connection is continuously maintained, even when the user does not wear the wearable device or the user is sleeping.

Thus, if a connected state between the wearable device and the smart phone is maintained or released as a motion of the wearable device is sensed, unnecessary power consumption may be reduced.

Figure 21:
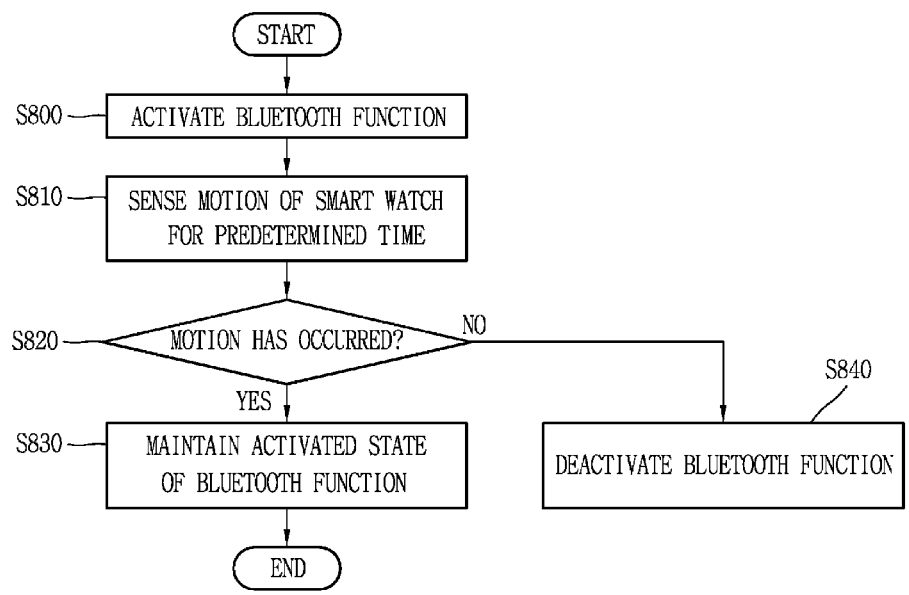
FIG. 21 is a flowchart illustrating an embodiment to release a connected state based on a motion according to the present invention.

FIG. 21 is a flowchart illustrating an embodiment to release a connected state based on a motion according to the present invention.

As shown in FIG. 21, in a state where a Bluetooth function is activated between the mobile terminal and a smart watch (S800), a controller 180 of the smart watch senses a motion of the smart watch for a predetermined time by using an acceleration sensor (S810). Then, the controller 180 determines whether a motion of the smart watch has occurred for a predetermined time or not (S820). If a motion of the smart watch is sensed for a predetermined time, the controller 180 maintains the activated state (on state) of the Bluetooth function (S830). On the contrary, if no motion of the smart watch is sensed for a predetermined time, the controller 180 deactivates the Bluetooth function (S840).

A case where a motion of the smart watch is sensed for a predetermined time may include a case where a user moves continuously, a case where a user stares at a point for a predetermined time (e.g., glasses-type terminal), and a case where a user is temporarily in a stationary state (e.g., a user wearing a smart watch on his or her wrist is resting his or her chin on his or her hand). A case where no motion of the smart watch is sensed for a predetermined time may include a case where a user wearing a smart watch on his or her wrist is sleeping, or a case where a user doesn't wear a smart watch.

If a user's finger is moved or if a user breathes out when pressing a button to capture a subject, a camera is micro-moved. This may result in movement of a picture. In order to solve such a picture movement, a handshake preventing function has been recently developed.

However, in the conventional art, the following problem may be caused. In a state where the handshake preventing function is set, if a user operates a camera using a tripod or at a stationary place having no motion, the handshake preventing function is performed. This may cause unnecessary consumption of power.

Thus, the present invention provides a method for selectively controlling 'on/off' of a handshake preventing function by sensing a motion of the mobile terminal.

FIGS. 22 to 24 are views illustrating a method of controlling various functions based on a motion according to the present invention.

FIG. 22 is a view illustrating an example to activate or deactivate a handshake preventing function based on a motion.

As shown in FIG. 22, the controller 180 controls 'on/off' of a handshake preventing function by sensing, in a camera mode, a motion of a user who is about to take a picture. That is, the controller 180 determines, in a camera mode, whether the mobile terminal is held by a user or fixed. If it is determined that the mobile terminal is in a fixed state, the controller 180 automatically deactivates the handshake preventing function to reduce power.

Thus, in the present invention, if a user performs an image capturing function while holding the mobile terminal in his or her hand, or while the user is at a moving position (e.g., inside of a running vehicle, on a moving ship, etc.), the handshake preventing function is activated. On the contrary, if a user performs an image capturing function using a tripod or if the user is at a stationary place having no motion, the handshake preventing function is automatically deactivated.

FIG. 23 is a view illustrating an example to reduce power consumption by reducing a GPS activation time, by automatically turning on/off a GPS function based on sensing of a user's motion.

As shown in FIG. 23, the controller 180 recognizes a user?s motion using the acceleration sensor. If a user's motion larger than a predetermined size (e.g., walking or running) is sensed, the controller 180 turns on a GPS function. On the contrary, if a user's motion larger than a predetermined size is not sensed or if a user is in a stationary state, the controller 180 automatically turns off the GPS function.

FIG. 24 is a flowchart illustrating an operation to activate or deactivate a glasses-function by sensing a user's motion.

Referring to FIG. 24, the controller 180 may determine a mounted state of a glasses-type terminal by a proximity sensor disposed at an inner side of an edge when a user takes off the glasses-type terminal (S900). If a user takes off a glasses-type terminal, the controller 180 senses a user's motion using an acceleration sensor (S910). The reason is because it is difficult to determine whether a user wishes not to use the glasses-type terminal any longer, merely on the ground of the user's taking off the glasses-type terminal. For instance, even if a user is holding the glasses-type terminal for a while or has put the glasses-type terminal in a pocket, after taking off the glasses-type terminal, the user may wish to maintain an always-on function (e.g., capturing moving images/recording dialogues).

Thus, it should be sensed whether a user's motion has occurred, and then it should be checked whether the user wishes not to use the glasses-type terminal any longer (S920).

If a user's motion has occurred, a glasses-function is maintained (S930). On the contrary, if a user?s motion has not occurred, it is determined that the user is holding the glasses-type terminal. As a result, the glasses-function is automatically deactivated to reduce power consumption (S940).

FIG. 25 is a view illustrating an embodiment to provide a pedestrian safety preview based on a motion, as an example of a motion-based low power implementing method according to the present invention. FIG. 26 is a view illustrating a detailed embodiment of FIG. 25.

The embodiment of FIG. 25 may be used consecutively to the function shown in FIG. 5, the function to automatically turn on an LCD and to release a screen-locked state. That is, if a user uses the mobile terminal in a state where an LCD is turned on and a screen-locked state is released, the controller 180 may determine whether the user is walking or not, based on an acceleration value obtained by the acceleration sensor (S1000, S1010). For instance, if a user is seating or standing, an acceleration value is not significantly changed. However, if a user is walking, an acceleration value is periodically increased and decreased. Thus, the controller 180 may check whether a user is walking or not, based on change of an acceleration value.

If a user is walking, the camera is activated so that a safety preview screen 70 can be displayed on the display unit 151 in the form of a pop-up screen (S1020). On the contrary, if a user is not walking, the camera is deactivated so that no safety preview screen can be provided.

Thus, in the present invention, a camera preview screen of a small size is provided according to a walking state, while the mobile terminal is being used. This can allow the user to conveniently view the front side when using the mobile terminal with walking. Especially, in the present invention, the camera preview screen is provided only when a user is walking, through recognition of peripheral situations. This can allow the mobile terminal to save power consumption by turning on the camera only when necessary.

FIG. 27 is a view illustrating an embodiment to automatically turn off a low-power screen based on a motion according to the present invention, and FIG. 28 is a view illustrating change of an acceleration value according to a position of an arm.

As shown in FIG. 27, the controller 180 of a smart watch may sense a motion of an arm (S1100). In case of the smart watch, a motion of an arm may be divided into a state where a user is viewing a screen, and a state where a user is not viewing a screen. The state where a user is not viewing a screen means a state where a user's arm is lowered. In this state, a large acceleration value is applied to 'X-Y' axes of the acceleration sensor. On the contrary, in the state where a user is viewing a screen, a large acceleration value is applied to a 'Z' axis of the acceleration sensor.

The controller 180 determines whether a user has lowered his or her arm after viewing a screen, based on an acceleration value by the acceleration sensor (S1110). If it is determined that an acceleration value is increased in directions of the X-Y axes after being increased in a direction of the Z-axis, the controller 180 recognizes that a user has lowered his or her arm after viewing a screen. Thus, the controller 180 automatically turns off a screen of the smart watch (S1120). On the contrary, if an acceleration value is not increased in directions of the X-Y axes after being increased in a direction of the Z-axis, the controller 180 maintains a screen-on state of the smart watch.

In the above embodiment, the screen is turned off more rapidly than in a case where the screen is automatically turned off after a predetermined time lapses. This can allow power consumption to be reduced.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The invention claimed is:

1. A motion-based low power implementing method of a mobile terminal, the method comprising:
sensing a motion of a user in a state that a camera is deactivated and an acceleration sensor is activated;
activating the camera in response to the sensed motion; and
deactivating the camera and maintaining an activation state of the acceleration sensor when no motion is sensed,
wherein the method further comprises:
determining a screen-off time based on at least one of whether an object has approached the mobile terminal and whether a motion of the mobile terminal is sensed;
if no input has been applied for a predetermined time in a screen-on state, sensing whether the object has approached the mobile terminal through a proximity sensor;
determining the screen-off time as a first period of time when the proximity sensor senses the object has approached the mobile terminal;
if no input has been applied for the predetermined time in the screen-on state and no object has approached the mobile terminal, sensing the motion of the mobile terminal through the acceleration sensor;
determining the screen-off time as a second period of time longer than the first period of time when the motion of the mobile terminal is not sensed; and
determining the screen-off time as a third period of time of longer than the second period of time when the motion of the mobile terminal is sensed.

2. The method of claim 1, further comprising:
checking a type of the sensed motion;
detecting a face by temporarily driving the camera if the sensed motion type is a facing motion to take the mobile terminal toward the face;
authenticating a user of the detected face; and
releasing a screen-locked state after turning on a screen or displaying additional information in a screen-off state when the user authentication is completed,
wherein the additional information includes a watch image or notification information indicating reception of an email and a call.

3. The method of claim 1, further comprising:
checking a type of the sensed motion; and
displaying a safety preview on one side of a screen when the checked motion type is walking.

4. The method of claim 1, further comprising:
if a user's activity is not sensed while a user's activity amount is measured by a sensor, deactivating the sensor not to measure the user's activity amount.

5. The method of claim 1, further comprising:
determining a sleep type based on the sensed motion; and
controlling a quality of sleep not to be measured if the detect fined sleep type corresponds to an awake state, but to be measured if the determined sleep type corresponds to a sleep state.

6. The method of claim 1, further comprising:
checking an important degree of measurement data at a user's current position, based on a continuous state of the sensed motion; and
adaptively controlling a measurement period of environmental data according to the checked important degree of the measurement data.

7. The method of claim 1, further comprising:
temporarily releasing a function being currently executed if no motion is sensed,
wherein the function being currently executed includes a Bluetooth function, a handshake preventing function and a GPS function.

8. The method of claim 1, further comprising:
sensing a detached state of a glasses-type terminal;
sensing a motion of the glasses-type terminal when the glasses-type terminal is detached; and
turning off a glasses-function when no motion of the glasses-type terminal Occurs.

9. The method of claim 1, further comprising:
determining a wrist position of a user who is wearing a smart watch, based on a sensing value sensed by the acceleration sensor; and
turning off the screen if the determined position of the wrist is a not a position to view a screen.

10. The method of claim 1, further comprising:
checking an activity type and an activity amount by collecting and sorting activity data of the user when the camera is activated; and
displaying the checked activity type and activity amount on a circular time line.

11. The method of claim 10, wherein an icon indicating an exercise type is displayed at an inner side of the circular time line, and
wherein the icon is displayed in the same color when indicating the same exercise.

12. The method of claim 10, further comprising calculating calories consumed per activity and total calories based on the checked activity type and activity amount, and displaying the calculated calories on the circular time line.

13. A mobile terminal, comprising:
a sensing unit configured to sense a motion of a user in a state that a camera is deactivated and an acceleration sensor is activated, wherein the camera and the acceleration sensor are included in the sensing unit; and
a controller configured to:
activate the camera in response to the sensed motion,
deactivate the camera and maintain an activation state of the acceleration sensor when no motion is sensed,
determine a screen-off time based on at least one of whether an object has approached the mobile terminal and whether a motion of the mobile terminal is sensed,
if no input has been applied for a predetermined of time in a screen-on state, sense whether the object has approached the mobile terminal through a proximity sensor included in the sensing unit,
determine the screen-off time as a first period of time when the proximity sensor senses the object has approached the mobile terminal,
if no input has been applied for the predetermined time in the screen-on state and no object has approached the mobile terminal, sense the motion of the mobile terminal through the acceleration sensor,
determine the screen-off time as a second period of time longer than the first period of time when the motion of the mobile terminal is not sensed, and
determine the screen-off time as a third period of time longer than the second period of time when the motion of the mobile terminal is sensed.

14. The mobile terminal of claim 13, wherein if the sensed motion is a facing motion to take the mobile terminal toward a face, the controller performs a face detection and a face authentication by temporarily driving the camera, wherein the controller releases a screen-locked state after turning on a screen and or displays additional information in a screen-off state when the face authentication is completed, and wherein the additional information includes a watch image or notification information indicating reception of an email and a call.

15. The mobile terminal of claim 13, wherein the controller checks a motion type based on a sensing value sensed by the acceleration sensor, and displays a safety preview on one side of a screen if the checked motion type is walking.

16. The mobile terminal of claim 13, wherein the controller turns off the sensor not to measure a user's activity amount when a user's activity is not sensed while the user's activity amount is measured by the sensing unit.

17. The mobile terminal of claim 13, wherein the controller is further configured to:

determine a sleep type based on the sensed motion, and measure a quality of sleep when the determined sleep type corresponds to a sleep state and not to measure the quality of sleep when the determined sleep type corresponds to an awake state.

18. The mobile terminal of claim 13, wherein the controller checks an important degree of measurement data at a user's current position, based on a continuous state of the sensed motion, and adaptively controls a measurement period of environmental data according to the checked important degree of the measurement data.

19. The mobile terminal of claim 13, wherein the controller temporarily releases a function being currently executed if no motion is sensed, and wherein the function temporarily released includes a Bluetooth function, a handshake preventing function and a GPS function.

20. The mobile terminal of claim 13, wherein the controller deactivates a glasses-function, if no motion of a glasses-type terminal is sensed, in a detached state of the glasses-type terminal.

21. The mobile terminal of claim 13, wherein the controller determines a wrist position of a user who is wearing a smart watch, based on a sensing value sensed by the acceleration sensor, and turns off the screen when the determined position of the wrist is a not a position to view a screen.

22. The mobile terminal of claim 13, wherein the controller is configured to check an activity type and an activity amount by collecting and sorting activity data of the user when the camera is activated, and to display the checked activity type and activity amount on a circular time line.

23. The mobile terminal of claim 22, wherein an icon indicating an exercise type is displayed at an inner side of the circular time line, and wherein the icon is displayed in the same color when indicating the same exercise.

24. The mobile terminal of claim 22, wherein the controller is further configured to calculate calories consumed per activity and total calories based on the checked activity type and activity amount, and to display the calculated calories on the circular time line.

\* \* \* \* \*